United States Patent

[11] 3,624,344

[72] Inventor Louis G. Kutzer
    Latrobe, Pa.
[21] Appl. No. 33,935
[22] Filed May 1, 1970
[45] Patented Nov. 30, 1971
[73] Assignee The Carborundum Company
    Niagara Falls, N.Y.
    Continuation-in-part of application Ser. No.
    749,833, Aug. 2, 1968, now abandoned.
    This application May 1, 1970, Ser. No.
    33,935

[54] ATTACHMENT OF NONMETALLIC ARTICLES TO METALLIC SUBSTRATES
    7 Claims, 8 Drawing Figs.

[52] U.S. Cl. .................................................. 219/127,
    287/189.36 B
[51] Int. Cl. ................................................. B23k 9/00
[50] Field of Search ........................................ 219/127,
    94, 98, 99; 287/189.36 A, 189.36 B, 189.36 F,
    189.36 D

[56] References Cited
    UNITED STATES PATENTS

| | | | |
|---|---|---|---|
| 2,860,230 | 11/1958 | Rapasky | 219/94 |
| 2,986,244 | 5/1961 | Hutchison | 287/189.36 |
| 3,095,951 | 7/1963 | Rood et al. | 219/94 |
| 3,204,083 | 8/1965 | Fromm et al. | 219/127 |

FOREIGN PATENTS

| | | | |
|---|---|---|---|
| 649,177 | 1/1951 | Great Britain | 219/99 |

Primary Examiner—J. V. Truhe
Assistant Examiner—L. A. Schutzman
Attorney—K. W. Brownell ABSTRACT: Ceramic articles such as segments in the form of blocks or plates are secured to an underlying metallic surface by means of metal retainers which are inserted in holes or openings extending through the ceramic material. The retainers have frustoconical outer surfaces which engage corresponding surfaces on the ceramic segments. The retainers are securely held to the metal surface by welding. The welding is accomplished by inserting a welding rod through a passage provided through the center of the metal retainer and forming a weld bead that extends from the metallic surface into the passage and beyond an internal flange located adjacent the inner end of said passage.

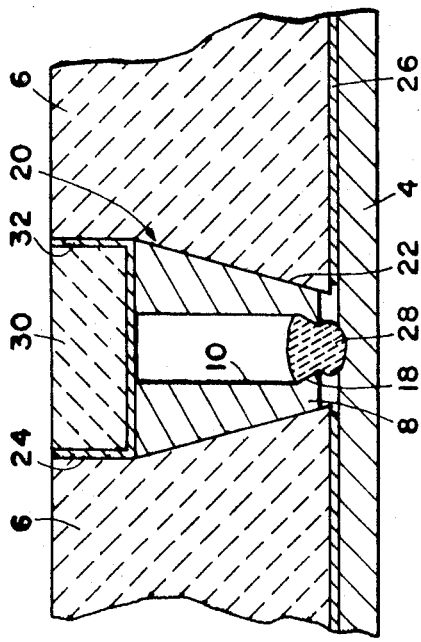
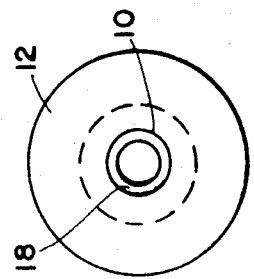
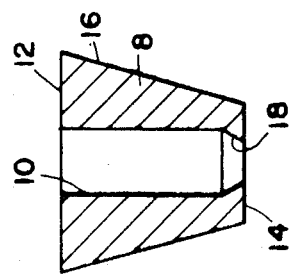
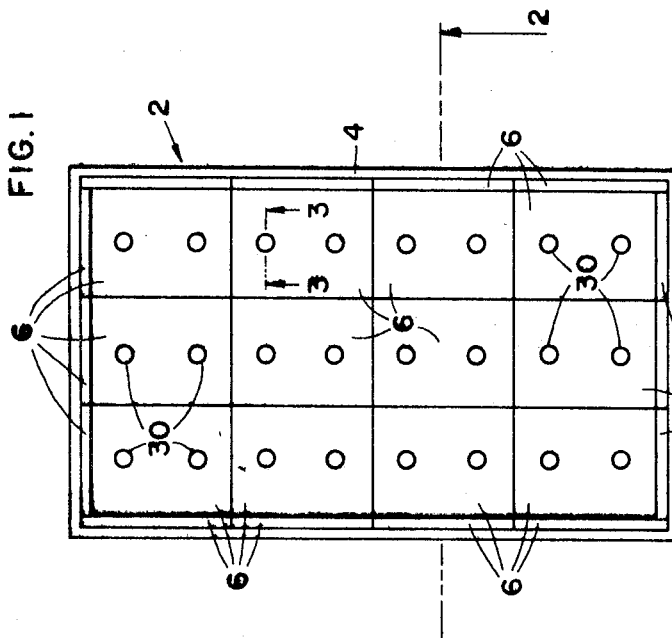
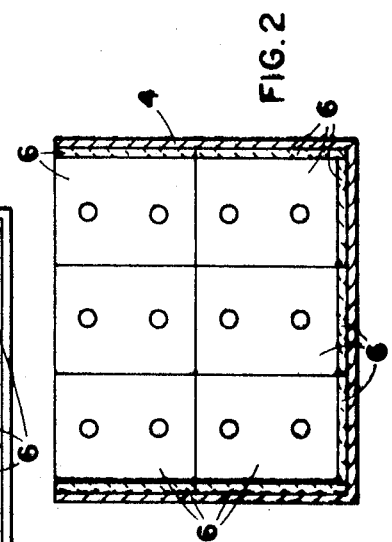

PATENTED NOV 30 1971
3,624,344
SHEET 2 OF 2
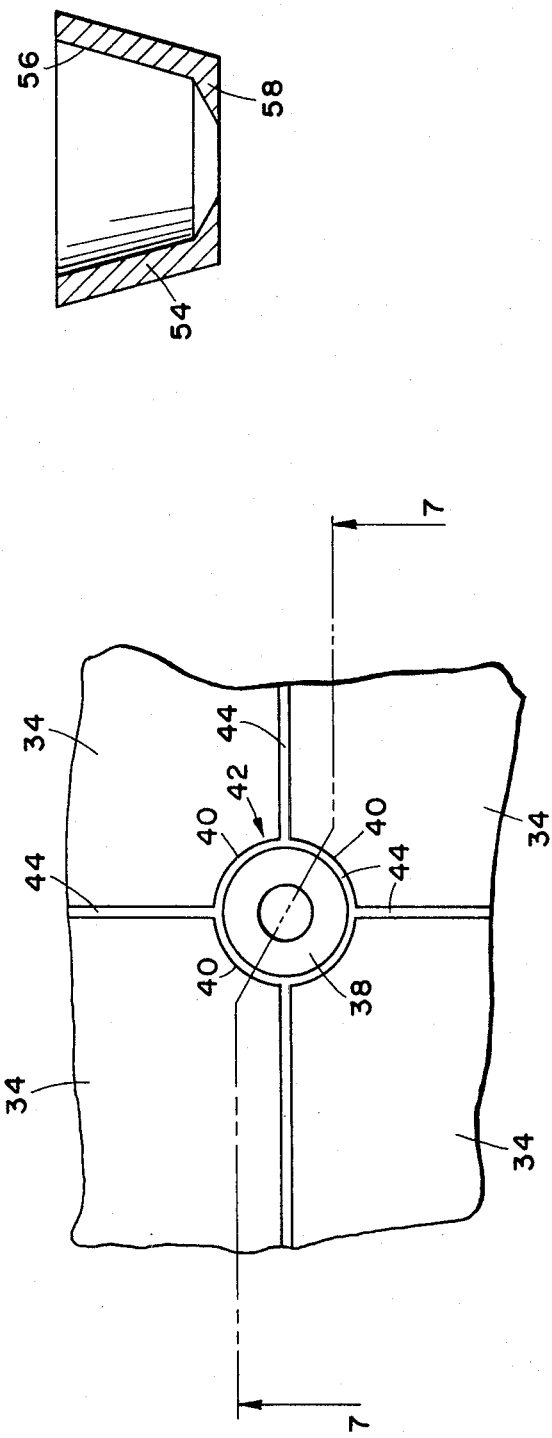
INVENTOR.
LOUIS G. KUTZER
BY
K.W. Brownell

3,624,344

ATTACHMENT OF NONMETALLIC ARTICLES TO METALLIC SUBSTRATES

BACKGROUND OF THE DISCLOSURE

This application is in part a continuation of copending application Ser. No. 749,833, filed Aug. 2, 1968, now abandoned.

This invention relates to the attachment of replaceable liners or covers for metallic surfaces, and more particularly, to the attachment and replacement of ceramic segments on metal surfaces.

A ceramic lining is utilized in conveyor chutes, conveyor buckets and similar installations where abrasive or corrosive material would cause such rapid wear that a bare metallic surface would be impractical. Also, in certain applications it is desirable to have a nonmetallic surface that is completely devoid of metal, depressions and foreign materials. Although it is desirable to use ceramic materials in such installations, conventional methods of securing the ceramic segments on the metal surface do not permit a segment to be conveniently replaced if it should break or become worn after the entire lining has been installed.

Attempts have been made to mold metal fasteners into the ceramic articles. For example, the metal surface may have holes for receiving bolts and corresponding nuts may be molded into the ceramic segment. Such an arrangement is impractical where the outer surface of the metal backing plate is not exposed or accessible. Furthermore, sockets must be formed in the ceramic segment and the nuts must be accurately positioned in the sockets and cemented in place, so that the edges of the ceramic segments will fit properly with adjacent segments. In certain other prior installations, the ceramic segments are locked together and secured to the backing plate by a frame or other means extending around their perimeter. This arrangement makes it difficult to replace individual segments of ceramic because of the interlocking, by means such as shoulders, between adjacent segments.

Accordingly, it is an object of this invention to provide a method and attachment means for rapidly installing and replacing individual ceramic segments on metal surfaces.

A further object of this invention is to provide means for installing ceramic linings of various thicknesses and various materials and over a wide range of sizes.

Another object of this invention is to provide for readily attaching ceramic segments to the metallic surface of a backing plate at various locations without requiring alteration of the backing plate.

SUMMARY OF THE INVENTION

These objects are accomplished in accordance with a preferred embodiment of the invention by employing ceramic blocks or segments which have frustoconical socket portions extending therethrough. A metallic retainer having a frustoconical outer surface is positioned in the socket portion of the ceramic article so that the lower end of the retainer is spaced slightly above the underlying metallic support surface. The retainer has a passage extending throughout its length and the passage has a sufficiently large diameter to allow a welding rod to be inserted in the passage. With the ceramic article in position on the metal surface, and with the retainer inserted in the socket portion, the slopes of the frustoconical surfaces of the retainer and the socket portion being substantially the same, a welding rod is inserted in the passage in the retainer and a weld bead is formed in the interior of the retainer joining together the retainer and the metallic surface. The retainer may be readily detached from the metal surface by drilling out the weld bead.

DESCRIPTION OF THE DRAWINGS

This preferred embodiment is illustrated in the accompanying drawings in which:

FIG. 1 is a top plan view of a metal bucket having ceramic liner segments secured therein in accordance with this invention;

FIG. 2 is a cross-sectional view of the bucket along the line 2—2 in FIG. 1;

FIG. 3 is an enlarged cross-sectional view of the bucket along the line 3—3 in FIG. 1;

FIG. 4 is a detail view of a retainer in longitudinal cross section;

FIG. 5 is a top plan view of the retainer illustrated in FIG. 4;

FIG. 6 is a top plan view of a modified liner installation;

FIG. 7 is a cross-sectional view of the modified installation along the line 7—7 in FIG. 6; and FIG. 8 is a longitudinal cross-sectional view of a further modified retainer.

DESCRIPTION OF THE PREFERRED EMBODIMENTS

FIGS. 1 and 2 are a somewhat schematic illustration of a skip bucket which might be used for conveying corrosive material such as coke from one location to another. The bucket 2 includes a metallic shell 4 forming the bottom, end walls, and side walls of the bucket. Superimposed on the shell surfaces in the interior of the bucket are a plurality of ceramic liner segments 6. These liner segments 6 are individually secured to the shell 4 by metallic retainers 8, as shown in FIG. 3.

A retainer 8 is shown in longitudinal cross section in FIG. 4 and in top plan view in FIG. 5. The retainer 8 has a central passage 10 extending from one end 12 to the opposite end 14. A frustoconical outer surface 16 coaxial with the passage 10 extends between the ends 12 and 14 of the retainer. An annular shoulder or flange 18 is formed in the interior of the passage 10 adjacent the small end 14 of the retainer.

The ceramic segment 6 has a socket 20 that extends from the upper, exposed surface of the segment to the lower surface which is adjacent the shell 4. The segments 6 are typically formed of molded and fired ceramics, such as alumina, or other nonmetallic heat and corrosive resistant material. The socket 20 has an inner frustoconical portion 22 and an outer cylindrical portion 24. The taper of the frustoconical portion 22 is approximately the same as that of the external surface 16 of the retainer 8. The length of the tapered portion 22, however, is slightly longer than the length of the retainer 8, so that the small end 14 of the retainer is spaced above the lower surface of the segment 6.

A layer 26 of bonding material, such as cement, adhesive, or mastic is applied to the inner surface of the metallic shell 4 to compensate for irregularities in the surface. A weld bead 28 is deposited at the bottom of the passage 10 by suitable welding techniques. The weld bead 28 is fused to the inner surface of the shell 4 and extends into the passage 10 beyond the shoulder 18 therein so that the retainer is rigidly secured to the shell 4. A cylindrical cover disc 30 is inserted in the upper, cylindrical portion 24 of the socket 20 to protect the retainer 8 from corrosive conditions existing at the upper surface of the segment 6. The cover 30 is preferably formed of the same material as the segment 6 and sealed in place by a suitable adhesive layer 32 applied to the peripheral and lower surfaces thereof.

In order to install the segments 6 in the bucket 2, a segment is positioned as desired on the shell 4 after the bonding layer 26 has been applied either to the lower surface of the segment 6 or to the upper surface of the shell 4. When the segment 6 is properly positioned on the shell 4, the retainer 8 is inserted in the socket 20. A shielded welding electrode is inserted through the passage 10 and the weld bead 28 is formed. Subsequently, the cover 30 is inserted over the retainer 8. Preferably the upper surface of the cover is flush with the upper face of the ceramic segment 6. The process is repeated for each segment until all the segments have been installed on the interior wall of the shell 4.

An important advantage of this invention is that the appropriate retainers may be readily removed in the event that one or more of the segments require replacement. To remove a retainer a drill is inserted in the central passage thereof to drill out the weld bead 28 and the shoulder 18 of the retainer.

The retainer is thereby released so that the segment which was secured in place by the retainer can now be removed. This permits the individual replacement of segments without disturbing adjacent segments.

In FIGS. 6 and 7 there is illustrated a modification of the present invention which permits the use of fewer metal retainers since a single retainer may be employed to hold the corners of a plurality of contiguous nonmetallic blocks or segments, each of which has a socket portion with arced periphery which together form a conical socket for the retainers. As shown therein, a plurality of rectangular, nonmetallic, such as ceramic, segments 34 are secured to a metal shell 36 by a frustoconical retainer 38 at adjacent corners of the segments. At each corner of the segments a socket portion, having the form of a tapered quadrant 40, is provided, the four adjacent socket portions cooperating to form a common socket 42 for the retainer 38. The segments 34 have substantially straight sides which are perpendicular to the upper and lower surfaces and cement or adhesive 44 is applied between the adjacent segments and around the exterior face of the retainer 38. A similar bonding layer 46 may be applied between the surface of the shell 36 and the segments 34, if necessary or desired. The layers 44 and 46 as well as the adhesive layers 26 and 32 are exaggerated in thickness in certain of the drawings.

The retainer 38 has a central passage 48 extending throughout the length of the retainer and concentric with the frustoconical outer surface. At the lower end of the passage 48, an inwardly directed annular shoulder 50 is provided. A weld bead 52 is formed at the lower end of the retainer 38 by suitable welding techniques, and the weld bead rigidly joins the retainer to the metallic shell 36. As shown in FIG. 7, the larger upper end of the retainer 38 is approximately coplanar with the exposed surfaces of the segments 34. If the segments 34 are mounted on a chute or a slide, or in some environment where the metal retainer 38 is not exposed to excessive abrasion or corrosion, the retainer may remain uncovered. If desired, however, the retainer 38 may be shorter in length than the thickness of the segments with which it is used and a ceramic plug or disc may be inserted in the socket above it, in a manner similar to that used in the embodiment of FIGS. 1–5.

In order to install a liner in a metal shell according to the the embodiment of FIGS. 6 and 7, the segments 34 are arranged as shown in FIG. 6 on the metallic surface of the shell 36, and the retainer 38 is inserted in the socket 42 formed by the socket portions of the adjacent segments. A welding rod is inserted through the passage 48 to form a weld bead 52 engaging the shell 36 and extending above the shoulder 50 formed in the passage 48. Similar retainer installations are provided at each corner of the various segments 34, so that the segments are rigidly secured to the shell 36.

FIG. 8 illustrates a further modified form of retainer. This retainer 54 has a frustoconical outer surface and a frustoconical passage 56 therethrough so that the thickness of the wall of the retainer remains substantially constant. At the lower end of the retainer, however, an annular shoulder 58 projects inwardly in the passage 56 to cooperate with a weld bead for securing the retainer 54 to a metallic surface. The large opening at the upper end of the retainer 54 and the short axial length of the retainer are particularly suitable for welding retainers of small size, because of the relatively larger clearance that is provided.

The attachment of nonmetallic, such as ceramic, wear plates or segments to a metallic shell in accordance with this invention may be carried out quickly and easily. The use of metal retainers which are welded to the shell or other metal backing is readily adapted to a variety of thicknesses of segments, and a wide variety of nonmetallic materials for the segments.

While this invention has been illustrated and described in several preferred embodiments, it is recognized that variations and changes may be made therein without departing from the invention as set forth in the claims.

What is claimed is:

1. In combination, an underlying metal surface; a nonmetallic article superimposed on said underlying surface, said article having a face adjacent said underlying surface and a face opposite thereto and having a socket portion extending from one of said faces to the other, the periphery of said socket portion being arced in cross section and at least a portion thereof being of decreasing radius as it approaches the first-mentioned face of said article; a metallic retainer having a frustoconical outer surface with a slope approximately the same as that of said socket portion, within and closely fitting the portion of said socket portion having the decreasing radius, said retainer having a passage therethrough coaxial with said frustoconical surface and an annular, inwardly directed flange projecting into said passage adjacent the smaller end of said retainer; and a weld bead securing together said underlying surface and said retainer and extending into said passage beyond said flange, whereby said retainer is held close to but spaced from said underlying surface and said nonmetallic article is firmly retained on said underlying surface.

2. The combination set forth in claim 2 wherein the nonmetallic article is ceramic.

3. The combination set forth in claim 2 wherein the retainer is shorter in length than the thickness of said ceramic article.

4. The combination set forth in claim 3 wherein a cover for said retainer is provided in the upper portion of said socket portion.

5. The combination set forth in claim 4 wherein said cover is the same material as said ceramic article.

6. The combination as set forth in claim 2 wherein said retainer is fitted into a plurality of adjacent socket portions each said portion being formed in a separate one of a plurality of contiguous ceramic articles.

7. A method of installing a nonmetallic article on an underlying metallic surface, said article having a face adjacent said underlying surface and a face opposite thereto and having a socket portion extending from one of said sides to the other, the periphery of said socket portion being arced in cross section and at least a portion thereof being of decreasing radius as it approaches the first-mentioned face of said article, which comprises fitting a metallic retainer in said socket portion of decreasing radius, said retainer having a frustoconical outer surface with a slope approximately the same as that of said socket portion and having a passage therethrough coaxial with said frustoconical surface and an annular, inwardly directed flange projecting into said passage adjacent the smaller end of said retainer, inserting a welding rod through said passage to said underlying surface, and depositing a weld bead on said underlying surface and into said passage above said flange.

* * * * *

UNITED STATES PATENT OFFICE
CERTIFICATE OF CORRECTION

Patent No. 3,624,344　　　　　　　　Dated November 30, 1971

Inventor(s) Louis G. Kutzer

It is certified that error appears in the above-identified patent and that said Letters Patent are hereby corrected as shown below:

In column 4, lines 33-34, claim 2 should read:

-- 2. The combination set forth in claim 1 wherein the nonmetallic article is ceramic. --

Signed and sealed this 12th day of September 1972.

(SEAL)
Attest:

EDWARD M. FLETCHER, JR.　　　　　　ROBERT GOTTSCHALK
Attesting Officer　　　　　　　　　　Commissioner of Patents